Patented Nov. 26, 1946

2,411,802

UNITED STATES PATENT OFFICE 2,411,802

PURIFICATION OF AMINE REACTION MIXTURES

John F. Olin, Grosse Ile, Mich., assignor to Sharples Chemicals Inc., Philadelphia, Pa., a corporation of Delaware No Drawing. Application May 5, 1944,
Serial No. 534,353

6 Claims. (Cl. 260—585)

The present invention pertains to the purification of crude reaction mixtures resulting from ammonation-reduction of aliphatic aldehydes or ketones by reaction thereof with ammonia or amines, and hydrogen in the presence of a hydrogenation catalyst. Amination reactions of this general type are well known in the art, and have been performed both in the liquid and in the vapor phase, as illustrated respectively by the article by Mignonac in "Comptes Rendus," volume 172, page 223, and the copending application of John F. Olin & James F. McKenna, Serial Number 428,548, filed January 28, 1942.

While the selective production of mono-, di- and tri-alkyl amines may, to a large extent, be controlled by appropriate control of the proportions of reactants employed, it is inevitable that, in a process of this kind, a mixture of the three amines will be obtained in use of ammonia as the aminating agent, or a mixture of di- and tri-alkyl amines obtained in cases in which a mono-aliphatic amine is used as the aminating agent. In the majority of cases of use of these amines, the user wishes to employ one of the three amines resulting from the reaction to the virtual exclusion of the other two. It is also necessary that the amines or mixture of amines obtained from the reaction be separated from other contaminating impurities, such as nitriles, carbamates, imines, carbon dioxide, ammonia, aldehydes or ketones, alcohols, etc. The removal of certain of these impurities presents a problem, not only because of the fact that the impurities are undesirable in the finished products, but also because of the fact that the presence of the impurities in the reaction mixture renders the problem of separation of the amines from each other more difficult. While the invention may be applied in purification of reaction mixtures obtained by ammonation-reduction of either aldehydes or ketones regardless of carbon content, it is especially recommended for treatment of such mixtures obtained from aldehydes. Problems encountered in purification of amine-containing reaction mixtures from ammonation-reduction of aldehydes containing from two to six carbon atoms can be solved with particular advantage by practice of the invention. Ketones of from three to six carbon atoms are also within the preferred range of the invention.

The present invention rests upon the discovery that, when reaction mixtures such as those discussed above are thoroughly mixed with an aqueous solution of an inorganic base, and the amines contained in the reaction mixture are thereafter removed by distillation from the resulting mixture, the operations of separating the respective amines from each other and from impurities is greatly facilitated. While I do not wish to be limited by any theoretical reasoning concerning results attained by the practice of the invention, it is believed that the treatment of the crude reaction mixture by an inorganic base results in reactions by which certain constituents of the amine-containing reaction mixture undergo a chemical change which results in their conversion into non-volatile, water-soluble, salts, and that the removal of these constituents in the form of an aqueous solution permits the remaining constituents of the reaction mixture to be separated from each other with greater facility. The basic treatment also serves to liberate the desired amines from chemical combination in other constituents of the mixture, such as carbamates and imines and thus to improve the yield while facilitating efficient distillation. When reaction mixtures containing carbamates have been distilled, this has resulted in plugging distillation equipment and also in inefficient separation of the amines from each other. By the preliminary treatment of the present invention, both of these difficulties are avoided.

The process of the present invention may be accomplished either by batch or continuous operation. If it is accomplished by batch operation, the crude amine-containing reaction mixture (after removal of fixed gases, if desired) may be mixed with an aqueous basic solution for a sufficient length of time to effect solution in the aqueous phase of reaction products of the base upon constituents of the reaction mixture. This may be accomplished at atmospheric or super-atmospheric pressure, but I prefer to operate at super-atmospheric pressure, since, by so operating, the reaction mixture may be maintained in the liquid phase at elevated temperatures, and the use of elevated temperatures facilitates the rapid completion of the reaction by which impurities which react with the base are converted into non-volatile water-soluble salts. In some cases, the amine-containing reaction mixture will contain a sufficient amount of water to dissolve the added base, and in such case the base may be added in solid form.

After the desired contact between the crude reaction mixture and the basic solution is accomplished, the constituents of the reaction mixture which are not converted into non-volatile compounds by treatment with the base are removed from the aqueous phase by distillation. This may be accomplished by fractional distillation from the aqueous phase; i. e., by distilling and separately condensing and collecting the separate constituents of the reaction mixture; or it may be accomplished by distilling overhead all of the constituents of the mixture resulting from the treatment with the basic solution which are more volatile than the basic solution itself, and thereafter subjecting the mixture of organic constituents so obtained in the distillate to a separate fractionation by distillation.

The present invention may be very effectively practiced in a continuous manner by mixing the crude amine reaction mixture with the aqueous basic solution during continuous flow of the crude reaction mixture, and subjecting the resulting mixture formed by addition of the base to distillation in the same apparatus in which the mixing operation takes place, or in separate apparatus. If such an operation is performed, it may involve concurrent flow of the amine mixture and basic solution to the zone of separation, or counter-current flow of the basic solution with respect to the amine-containing mixture with separation being accomplished immediately following the counter-current treatment. Thus, for example, the amine-containing mixture may be introduced into a fractionating column under pressure and temperature conditions at which it is maintained in vapor phase, and the basic solution may be introduced into an upper part of the same column in liquid phase. Such an operation results in intimate contact between the basic solution and the amine-containing mixture, with prompt reaction to form non-volatile salts, which are dissolved in the aqueous phase, as discussed above, the aqueous phase passing downwardly through the column at the same time that the remaining amine-containing reaction mixture is removed overhead as a distillate.

In case of practice of the invention on a reaction mixture obtained by a continuous ammonation-reduction (amination) reaction, the operation of treatment of the reaction mixture with a base is also preferably performed continuously, and is preferably accomplished by introduction of the amination reaction mixture continuously into the lower part of a column while introducing an aqueous basic solution into the upper part of this same column. In case of this type of operation, the basic solution is preferably relatively dilute, caustic soda solutions of between 5 and 15% concentration being preferred, although a considerably wider range is permissible. By using relatively dilute basic solutions in practice of the process continuously, the difficulty of precipitation of reaction products in the extraction column is avoided.

Part or all of the fixed gases of the reaction mixture may be removed before the treatment with the base and subsequent distillation, and when the invention is practiced by accomplishing the basic treatment in batch, this sequence is ordinarily used. In case of batch operation, much more concentrated solutions may be used than in case of continuous operation, and the invention may even be practiced by introducing the base as a solid in the case of batch operation, since the reaction mixture will ordinarily contain sufficient water to dissolve the added base, as pointed out above.

*Example I*

A crude reaction mixture obtained by passage of acetaldehyde together with ammonia and hydrogen through a heated reaction tube was first vented, through a column carrying an ammonia reflux, to remove hydrogen and most of the ammonia of the reaction mixture. 120 grams of flake sodium hydroxide were added to 938.5 grams of the residual crude reaction mixture, containing the three ethyl amines and various impurities. The resulting mixture was shaken vigorously, causing the added sodium hydroxide to dissolve in the water contained in the crude reaction mixture. The resulting mixture was then fractionally distilled, with the result that 359 grams of monoethyl amine, 139 grams of diethyl amine and 230 grams of wet triethyl amine (consisting of an azeotropic mixture of triethyl amine and water) were obtained. This distillation was accomplished without any difficulty, and the respective amines were obtained as very sharply defined fractions. When an attempt was made to separate an equivalent reaction mixture without the preliminary sodium hydroxide treatment, difficulty was encountered both in connection with the purity of the respective amine fractions, and because of plugging of the distillation equipment.

*Example II*

A crude reaction mixture formed by the reaction of acetaldehyde with ammonia and hydrogen by continuous vapor phase amination, was cooled to liquefy the ethyl amines and the higher boiling products and also part of the ammonia. Hydrogen, hydrocarbon and some ammonia were separated from the reaction mixture, and the remaining liquid products were passed into the central portion of a scrubbing column maintained at a temperature of about 100° C. An aqueous sodium hydroxide solution of 10% concentration was run into the column at a temperature of 125° C., and a pressure of about 75 pounds per square inch was maintained on the system during performance of the scrubbing operation by flow of the reaction mixture in counter-current direction to the ascending stream of gases to perform the scrubbing operation. The liquid leaving the bottom of the scrubber consisted essentially of water, sodium carbonate and sodium acetate, while the volatile organic substances and ammonia passed overhead. Upon subsequent fractionation of the overhead fraction, sharp separations between the respective amines were obtained.

*Example III*

A crude reaction mixture resulting from passage of butyraldehyde together with a molecular excess of hydrogen and ammonia over a catalyst consisting of pelleted nickel on kieselguhr at a temperature of approximately 155° C. was mixed with 10% of its weight of 50% NaOH solution and fractionally distilled with no appearance of interfering solid precipitated material in the column or condenser. Monobutyl amine of high titre was obtained directly in this fractionation. Dibutyl amine and tributyl amine were distilled overhead as azeotropic mixtures with water and separated from the water by decantation. The water was returned continuously to the pot of the distillation column until all of the di- and tri-butyl amines had been removed. The mixture of di- and tri-butyl amines obtained in this way was dried by treatment with a 50% NaOH solution. The amine layer containing the dry di- and tri-butyl amines was then fractionated to separate these amines from each other, and these respective amines were obtained in a high degree of purity.

While the invention has been especially useful in treatment of reaction mixtures containing amines of from 2 to 6 carbon atoms in their alkyl radicals as discussed above, it can also be practiced in treatment of crude methyl amine reaction mixtures obtained by ammonation-reduction of formaldehyde, and by treatment of reaction mixtures containing amines of more than six carbon atoms in their alkyl radicals.

Various modifications are possible within the scope of the invention, and I do not therefore wish to be limited except by the scope of the following claims.

I claim:

1. In the purification of amine-containing reaction mixtures resulting from reaction of aliphatic aldehydes with aminating agents and hydrogen, the process comprising mixing the crude reaction mixture containing the amine bases with an aqueous solution of an alkali metal hydroxide and subsequently separating the amine bases from the resulting aqueous solution by distillation.

2. In the purification of amine-containing reaction mixtures resulting from reaction of aliphatic aldehydes with aminating agents and hydrogen, the process comprising mixing the crude reaction mixture containing the amine bases with an aqueous solution of an inorganic base and subsequently separating the amine bases from the resulting aqueous solution by distillation.

3. In the purification of amine-containing reaction mixtures resulting from reaction of aliphatic aldehydes with aminating agents and hydrogen, the process comprising mixing the crude reaction mixture containing the amine bases with an aqueous solution of an inorganic base and subsequently separating the amine bases from the resulting aqueous solution and distilling said amines to separate them from each other.

4. In the purification of amine-containing reaction mixtures resulting from reaction of aliphatic aldehydes containing from 2 to 6 carbon atoms with aminating agents and hydrogen, the process comprising mixing the crude reaction mixture containing the amine bases with an aqueous solution of an inorganic base and subsequently separating the amine bases from the resulting aqueous solution by distillation.

5. In the purification of ethyl amine-containing reaction mixtures resulting from reaction of acetaldehyde with aminating agents and hydrogen, the process comprising passing the crude reaction mixture upwardly in vapor phase through a distillation column in counter-current relationship to an aqueous solution of an inorganic base passed downwardly through said column and removing the resulting aqueous solution downwardly from a lower portion of the column while the amine-containing mixture is passed upwardly in vapor phase through said column.

6. In the purification of amine-containing reaction mixtures resulting from reaction of a carbonyl compound chosen from the class consisting of aliphatic aldehydes and ketones with aminating agents and hydrogen, the process comprising mixing the crude reaction mixture containing the amine bases with an aqueous solution of an inorganic base and subsequently separating the amine bases from the resulting aqueous solution by distillation.

JOHN F. OLIN.